(12) United States Patent
Taguchi et al.

(10) Patent No.: US 10,019,017 B2
(45) Date of Patent: Jul. 10, 2018

(54) AUTONOMOUS DRIVING SYSTEM

(71) Applicant: Toyota Jidosha Kabushiki Kaisha, Toyota-shi Aichi-ken (JP)

(72) Inventors: Koji Taguchi, Isehara (JP); Hiroyuki Ishida, Nagakute (JP); Shuichi Yokokawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/424,091

(22) Filed: Feb. 3, 2017

(65) Prior Publication Data

US 2017/0227970 A1   Aug. 10, 2017

(30) Foreign Application Priority Data

Feb. 5, 2016   (JP) ................. 2016-021142

(51) Int. Cl.
*G05D 1/02* (2006.01)
*G05D 1/00* (2006.01)
(Continued)

(52) U.S. Cl.
CPC ......... *G05D 1/0276* (2013.01); *G05D 1/0088* (2013.01); *G05D 1/0246* (2013.01);
(Continued)

(58) Field of Classification Search
CPC .... G06T 7/70; G06T 7/73; G06T 7/74; G06T 7/75; G06T 7/77; G01S 19/42; G01S 19/421; G01S 19/426; G01S 19/45; G01S 19/46; G01S 19/47; G01S 19/48; G01S 19/49; G01S 19/50; G01S 19/51; G05D 1/0088; G05D 1/02; G05D 1/021; G05D 1/0231; G05D 1/0242; G05D 1/0246;
(Continued)

(56) References Cited

U.S. PATENT DOCUMENTS 8,612,135 B1   12/2013   Montemerlo et al.
2011/0208496 A1   8/2011   Bando et al.
(Continued)

FOREIGN PATENT DOCUMENTS

JP   3190739 B2   7/2001
JP   2005-132291 A   5/2005
(Continued)

*Primary Examiner* — Thomas G Black
*Assistant Examiner* — Sara J Lewandroski
(74) *Attorney, Agent, or Firm* — Dinsmore & Shohl LLP

(57) ABSTRACT

An autonomous driving system includes a positioning unit that measures a position of a vehicle; a database that stores map information; an actuator that controls traveling of the vehicle; and an electronic controller configured to process: a detection of a first vehicle position and the map information; an identification of a traveling scene based on the first vehicle position and the map information; a detection of a second vehicle position by preforming position detection processing; and a control of the actuator based on the second vehicle position if a distance between the first vehicle position and the second vehicle position is equal to or smaller than a threshold or a control of the actuator based on the first vehicle position if the distance is not equal to or smaller than the threshold.

6 Claims, 5 Drawing Sheets

(51) Int. Cl.
*G01S 19/42* (2010.01)
*G01C 21/34* (2006.01)

(52) U.S. Cl.
CPC ........... G05D 1/0257 (2013.01); *G01C 21/34* (2013.01); *G01S 19/42* (2013.01); *G05D 2201/0213* (2013.01)

(58) Field of Classification Search
CPC .. G05D 1/0248; G05D 1/0251; G05D 1/0253; G05D 1/0257; G05D 1/0268; G05D 1/027; G05D 1/0272; G05D 1/0274; G05D 1/0278; G05D 2201/0213; G01C 21/30; G01C 21/3602
See application file for complete search history.

(56) References Cited

U.S. PATENT DOCUMENTS

| | | | |
|---|---|---|---|
| 2013/0110343 A1 | 5/2013 | Ichikawa et al. | |
| 2014/0032100 A1* | 1/2014 | Park | G01C 21/30 701/446 |
| 2017/0016740 A1* | 1/2017 | Cui | G01C 21/30 |
| 2017/0177958 A1* | 6/2017 | Yamanoi | G01C 21/30 |
| 2017/0227647 A1* | 8/2017 | Baik | G01S 17/936 |
| 2017/0232974 A1* | 8/2017 | Nishida | B60W 50/082 701/24 |

FOREIGN PATENT DOCUMENTS

| | | | |
|---|---|---|---|
| JP | 2006-065703 A | | 3/2006 |
| JP | 2007240380 A | * | 9/2007 |
| JP | 2011-162132 A | | 8/2011 |
| JP | 2011-174771 A | | 9/2011 |
| JP | 5382218 B2 | | 1/2014 |
| WO | 2011/158347 A1 | | 12/2011 |

* cited by examiner

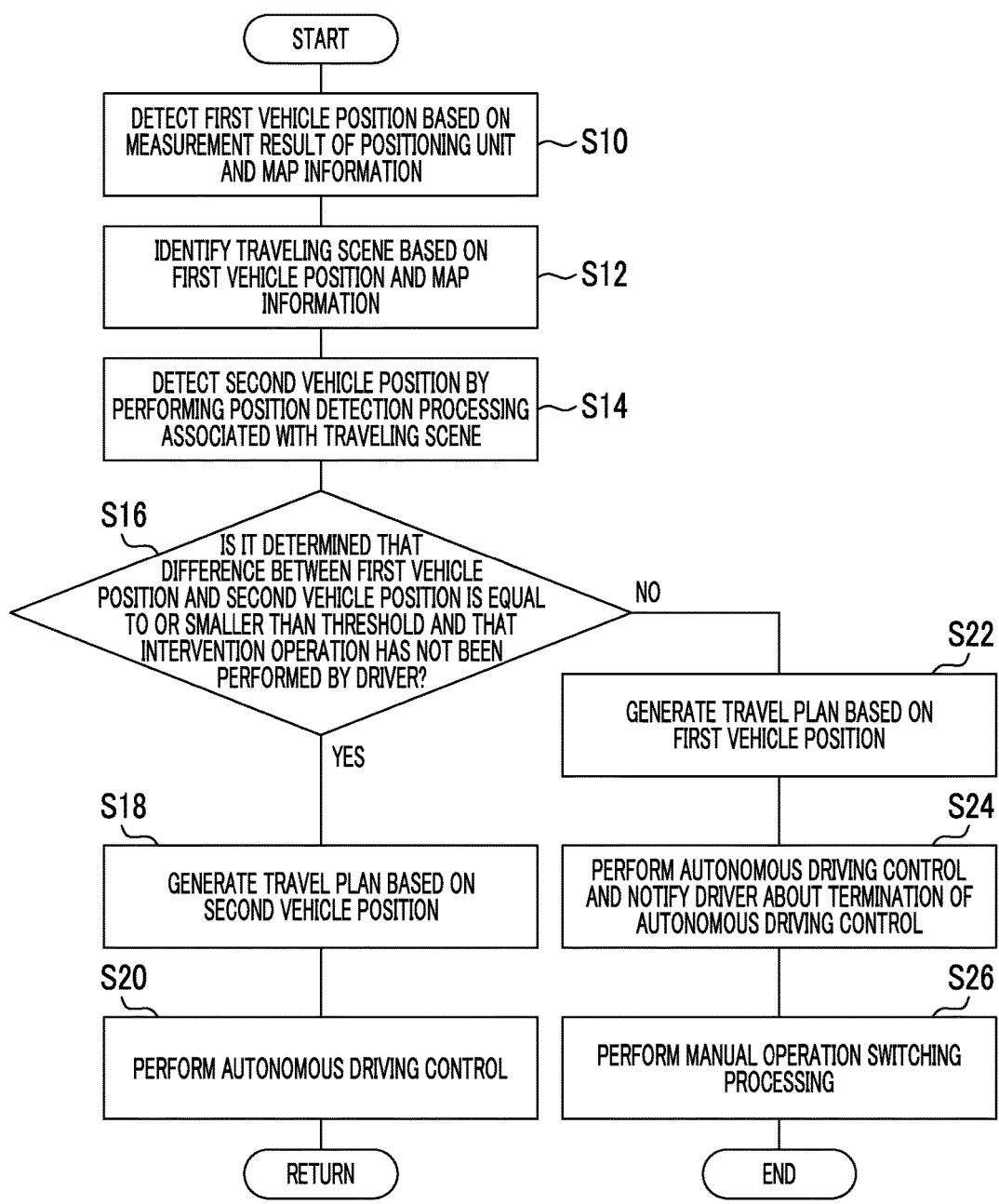

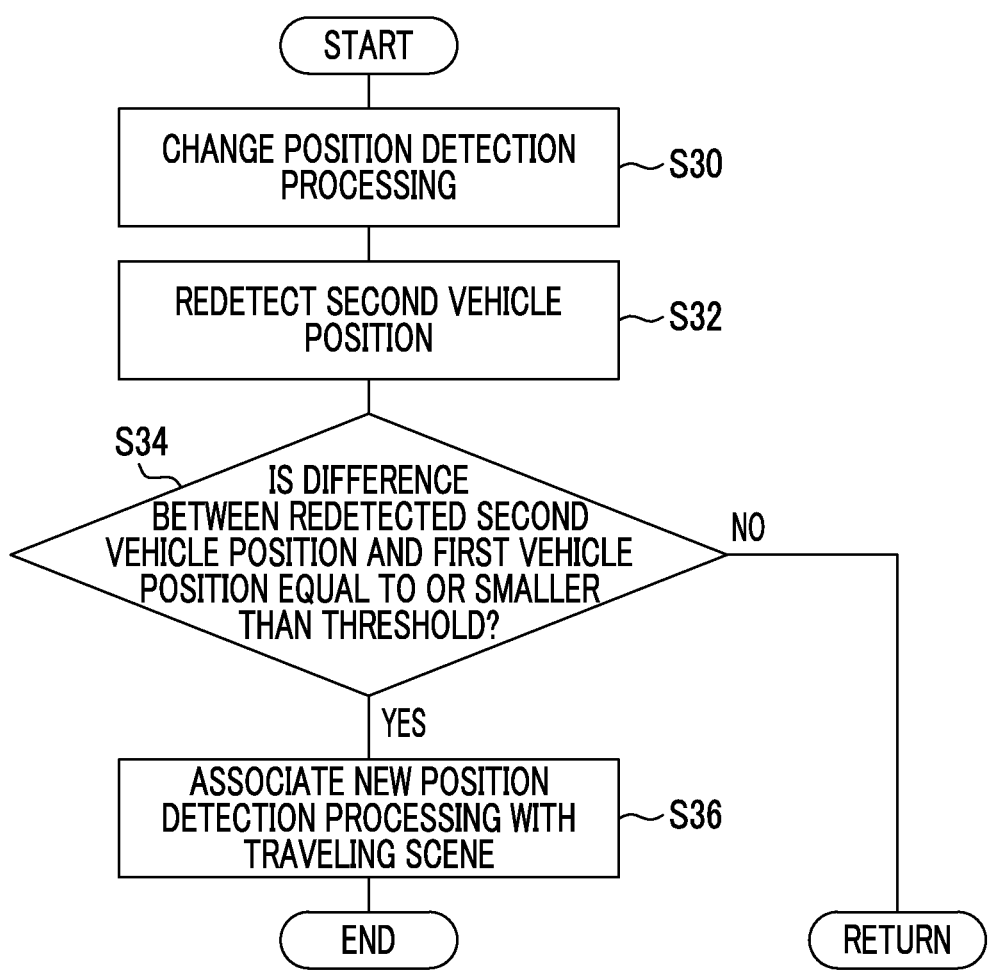

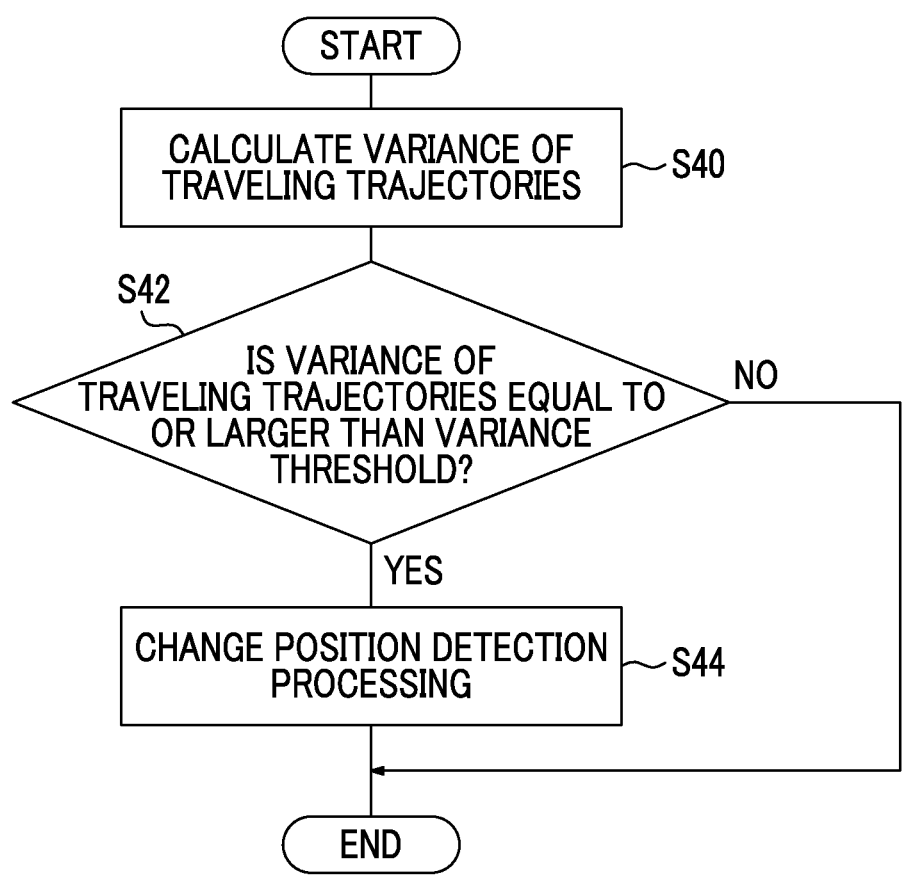

AUTONOMOUS DRIVING SYSTEM

CROSS-REFERENCE TO RELATED APPLICATIONS

This application claims priority to Japanese Patent Application No. 2016-021142 filed on Feb. 5, 2016 which is incorporated herein by reference in its entirety including the specification, drawings and abstract.

BACKGROUND

1. Technical Field

The present disclosure relates to an autonomous driving system.

2. Description of Related Art

As a technical document relating to the detection of a vehicle position such as that used in an autonomous driving device, Japanese Patent Application Publication No. 2005-132291 (JP 2005432291 A) is known. This technical document describes a system for detecting a vehicle position on a road in such a way that the system calculates the vehicle position using the hybrid navigation, which uses the measurement values obtained through the radio navigation and the estimated vehicle position obtained through the dead reckoning navigation, and then performs matching processing (hereinafter called map matching processing) between the calculated vehicle position and the map information.

In the meantime, autonomous driving control requires sufficient accuracy in detecting the vehicle position on a road. The system described above uses a vehicle position calculated using the hybrid navigation and performs map matching processing to detect the vehicle position. However, the detection of a vehicle position using such stereotypical processing may not give sufficient accuracy depending upon the situation in which the vehicle travels.

SUMMARY

In the present disclosure, an autonomous driving system, capable of increasing accuracy in detecting a vehicle position for use in autonomous driving control, is provided.

A first aspect of the present disclosure relates an autonomous driving system. The autonomous driving system includes a positioning unit configured to measure a position of a vehicle; a map database that stores map information; a first vehicle position detection unit configured to detect a first vehicle position based on a measurement result of the positioning unit and the map information, the first vehicle position being a vehicle position on a map; a traveling scene identification unit configured to identify a traveling scene of the vehicle based on the first vehicle position and the map information; a second vehicle position detection unit configured to detect a second vehicle position by preforming position detection processing, associated in advance with the traveling scene, based on a captured image of a camera mounted on the vehicle or a detection result of a radar sensor mounted on the vehicle, the measurement result of the positioning unit, and the map information, the second vehicle position being a vehicle position on the map; a determination unit configured to determine whether a distance between the first vehicle position and the second vehicle position is equal to or smaller than a threshold; and an autonomous driving control unit that performs autonomous driving control of the vehicle based on the second vehicle position if it is determined that the distance between the first vehicle position and the second vehicle position is equal to or smaller than the threshold or that performs the autonomous driving control of the vehicle based on the first vehicle position if it is determined that the distance between the first vehicle position and the second vehicle position is not equal to or smaller than the threshold.

A second aspect of the present disclosure relates an autonomous driving system. The autonomous driving system includes a positioning unit that measures a position of a vehicle; a map database that stores map information; an actuator that controls traveling of the vehicle; and an electronic controller configured to process: a detection of a first vehicle position based on a measurement result of the positioning unit and the map information stored in the map database, the first vehicle position being a vehicle position on a map; an identification of a traveling scene of the vehicle based on the first vehicle position and the map information; a detection of a second vehicle position by preforming position detection processing, associated in advance with the traveling scene, based on a captured image of a camera mounted on the vehicle or a detection result of a radar sensor mounted on the vehicle, the measurement result of the positioning unit, and the map information stored in the map database, the second vehicle position being a vehicle position on the map; and a control of the actuator based on the second vehicle position if a distance between the first vehicle position and the second vehicle position is equal to or smaller than a threshold or a control of the actuator based on the first vehicle position if the distance between the first vehicle position and the second vehicle position is not equal to or smaller than the threshold.

The autonomous driving systems in the aspects described above identify the traveling scene of the vehicle based on the first vehicle position and the map information and detect the second vehicle position by the position detection processing associated with the traveling scene in advance. This allows the autonomous driving system to use position detection processing appropriate to the traveling scene of the vehicle, thus increasing accuracy in detecting the vehicle position for use in autonomous driving control. In addition, since there is a possibility that the position detection processing of the second vehicle position is not appropriate if it is determined that the distance between the first vehicle position and the second vehicle position is not equal to or smaller than the threshold, the autonomous driving system performs the autonomous driving control of the vehicle based on the first vehicle position that does not depend on the traveling scene, thereby avoiding autonomous driving control based on a wrong vehicle position.

According to one aspect of the present disclosure, accuracy in detecting a vehicle position for use in autonomous driving control can be increased as described above.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart showing the autonomous driving control of the autonomous driving system;

FIG. 4 is a flowchart showing the learning processing of the autonomous driving system; and FIG. 5 is a flowchart showing another example of the learning processing of the autonomous driving system.

DETAILED DESCRIPTION OF EMBODIMENTS

An embodiment of the present disclosure is described below with reference to the drawings.

Figure 1:
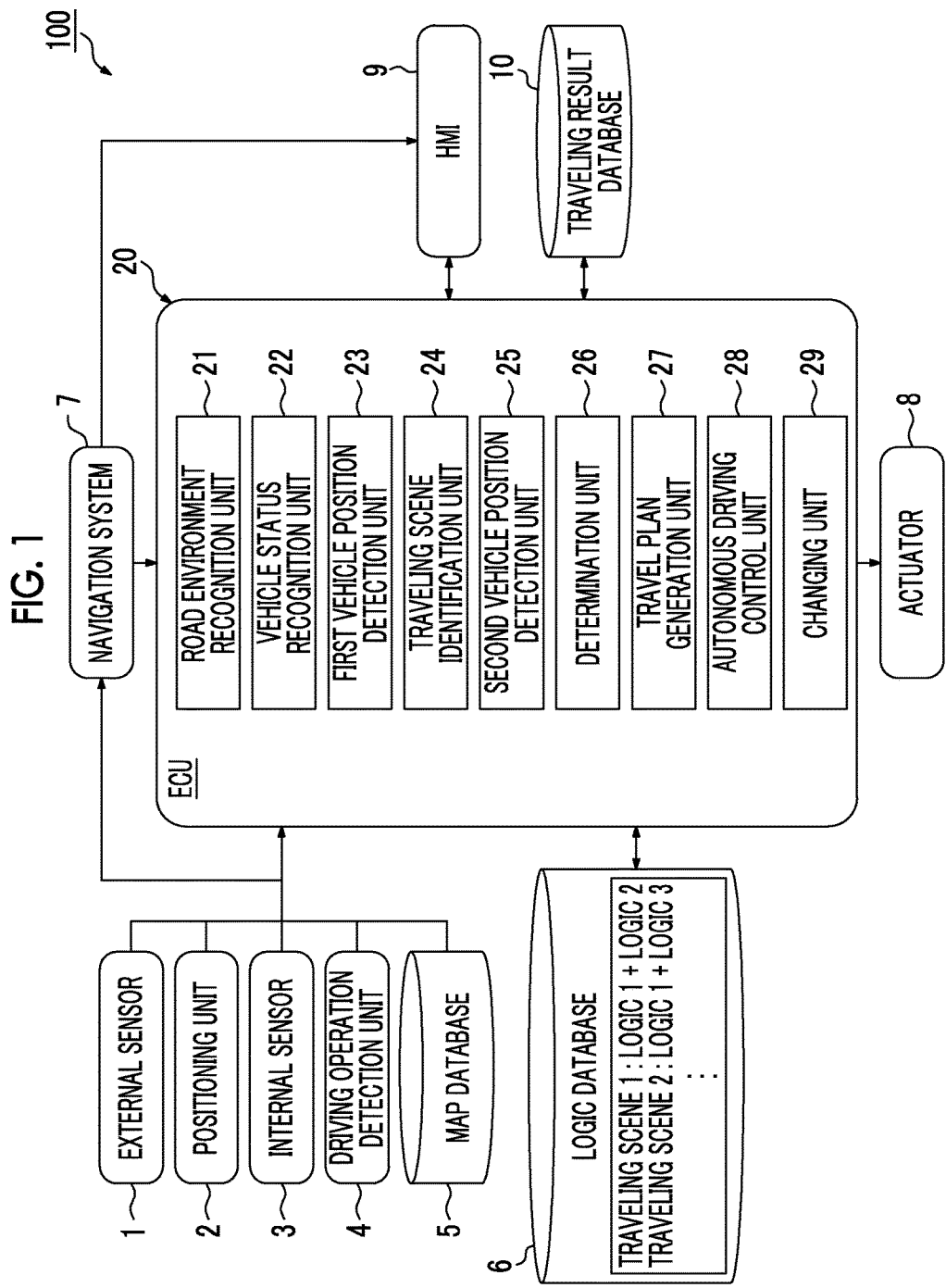
FIG. 1 is a block diagram showing an autonomous driving system in this embodiment.

An autonomous driving system 100 shown in FIG. 1, mounted on a vehicle such as a passenger car, is a system for performing the autonomous driving control of the vehicle. The autonomous driving system 100 starts the autonomous driving control of the vehicle when the driver performs the start operation of autonomous driving control (for example, the driver presses the start button of autonomous driving control).

Autonomous driving control refers to vehicle control for allowing a vehicle to autonomously travel along a target route that is set in advance. Under autonomous driving control, the vehicle travels autonomously with no need for the driver to perform the driving operation. The target route refers to a route on the map along which the vehicle will travel under autonomous driving control.

The autonomous driving system 100 identifies a traveling scene of the vehicle and detects the vehicle position by performing the position detection processing associated with the traveling scene in advance. The traveling scene and the position detection processing will be described in detail later. The autonomous driving system 100 performs autonomous driving control based on the detected vehicle position.

[Configuration of Autonomous Driving System]

As shown in FIG. 1, the autonomous driving system 100 includes an ECU 20 for performing autonomous driving control. The ECU 20 is an electronic control unit that includes a central processing unit (CPU), a read only memory (ROM), a random access memory (RAM), and a controller area network (CAN) communication circuit. The ECU 20 loads a program, stored in the ROM, into the RAM and executes the program, loaded into the RAM, using the CPU for implementing various functions. The ECU 20 may be configured by a plurality of electronic control units.

To the ECU 20, an external sensor 1, a positioning unit 2, an internal sensor 3, a driving operation detection unit 4, a map database 5, a logic database 6, a navigation system 7, an actuator 8, a human machine interface (HMI) 9, and a traveling result database 10 are connected.

The external sensor 1 is a detection apparatus for detecting obstacles around the vehicle. The external sensor 1 includes at least one of a camera and a radar sensor. The external sensor 1 is used also for the white line recognition (marking line recognition), which will be described later, of a traveling lane in which the vehicle travels.

The camera is a capturing apparatus that captures the external situation of the vehicle. The camera is provided on the interior side of the windshield, and on the interior side of the rear windshield, of the vehicle. The camera may be provided on the right and left sides of the vehicle. The camera sends captured images, generated by capturing the scene ahead of and behind the vehicle, to the ECU 20. The camera may be a monocular camera or a stereo camera. The stereo camera includes two capturing units arranged so that the disparity between the right eye and the left eye can be reproduced. The images captured by the stereo camera also include the depth-direction information.

The radar sensor detects an obstacle around the vehicle using a radio wave (for example, a millimeter wave) or light. The radar sensor detects an obstacle by sending a radio wave and/or light to the surroundings of the vehicle and receiving a radio wave and/or light reflected by an obstacle. The radar sensor sends the detected obstacle information (detection result) to the ECU 20. In addition to the non-moving obstacles such as guardrails and buildings, the obstacles include moving obstacles such as pedestrians, bicycles, and other vehicles.

The positioning unit 2, mounted on the vehicle, functions as a position measurement unit that measures the vehicle position. The positioning unit 2 receives signals from three or more global positioning system (GPS) satellites to measure the position of the vehicle (for example, the latitude and longitude of the vehicle). The positioning unit 2 sends the measured vehicle position information to the ECU 20.

The internal sensor 3 is a detection apparatus that detects the traveling status of the vehicle. The internal sensor 3 includes a vehicle speed sensor, an acceleration sensor, and a yaw rate sensor. The vehicle speed sensor is a detection apparatus that detects the speed of the vehicle. An example of the vehicle speed sensor is a wheel speed sensor that is provided on the wheels of the vehicle, or on the drive shaft that rotates in synchronization with the wheels, to detect the rotation speed of the wheels. The vehicle speed sensor sends the detected vehicle speed information to the ECU 20.

The acceleration sensor is a detection apparatus that detects the acceleration of the vehicle. The acceleration sensor includes a longitudinal acceleration sensor that detects acceleration in the longitudinal direction of the vehicle and a lateral acceleration sensor that detects the lateral acceleration of the vehicle. The acceleration sensor sends the vehicle acceleration information to the ECU 20. The yaw rate sensor is a detection apparatus that detects the yaw rate (turning angle velocity) around the vertical axis at the center of gravity of the vehicle. A gyro sensor may be used as the yaw rate sensor. The yaw rate sensor sends the detected vehicle yaw rate information to the ECU 20.

The internal sensor 3 may include a steering angle sensor. The steering angle sensor is a sensor that detects the steering angle (actual steering angle) of the vehicle. The steering sensor is provided on the steering shaft of the vehicle. The steering angle sensor sends the detected steering angle information to the ECU 20.

The driving operation detection unit 4 detects a driving operation performed by the driver of the vehicle. The driving operation detection unit 4 includes a steering sensor, an accelerator pedal sensor, and a brake pedal sensor. The steering sensor, provided on the steering shaft of the host vehicle, detects the steering torque on the steering wheel applied by the driver. The accelerator pedal sensor, provided on the shaft of the accelerator pedal, detects the accelerator pedal depression amount (accelerator pedal position). The brake pedal sensor, provided on the shaft of the brake pedal, detects the brake pedal depression amount (brake pedal position). The driving operation detection unit 4 sends the detected driving operation information to the ECU 20.

The map database 5 is a database that stores map information. The map database 5 is formed in a hard disk drive (HDD) mounted on the vehicle. The map information includes position information on roads (position information on each lane), information on road shapes (for example, information on whether a road is a curved road or a straight road, the curvature of a curved road), information on road widths (information on lane widths), information on road slopes, information on the cant angle of a road, and information on the maximum vehicle speed on a road. The map information also includes position information on intersections and branching points, position information on stop lines, position information on pedestrian crossings, and position information on traffic lights. In addition, the map information includes position information on white lines (the position information may be stored, not as a line, but as a sequence of points), information on white-line types, information on the positions and the shapes of non-moving obstacles such as curbs, telephone poles, poles, guardrails, walls, and buildings, and information on the positions and the shapes of road surface markings such as symbols and marks painted on a road surface.

The logic database 6 is a database that stores a plurality of position detection processing logics (position detection logics) used for detecting the position of the vehicle. The position detection processing is processing for detecting the vehicle position based on the detection result of the external sensor 1 (images captured by the camera, results detected by the radar sensor). The position detection processing is stored in association with traveling scenes of the vehicle. The position detection processing is stored, one for each traveling scene. The position detection processing will be described in detail later.

In addition, the logic database 6 stores camera-captured images each associated with the map information (latitude, longitude) stored in the map database 5. The logic database 6 may store a camera-captured image as an overhead view seen from above the vehicle.

The navigation system 7, mounted on the vehicle, sets a target route on which the vehicle will travel under autonomous driving control. The navigation system 7 calculates a target route, from the vehicle position to the destination E, based on the vehicle position (first vehicle position or second vehicle position) that will be described later, the destination that is set in advance, and the map information stored in the map database 5. The destination E of autonomous driving control is set when an occupant of the vehicle performs an operation on the input button (or touch panel) provided on the navigation system 7. The target route is set by identifying each of the lanes that form the road. The navigation system 7 may set the target route using a known method. For use when the driver manually drives the vehicle, the navigation system 7 may have the function to guide the driver along the target route. The navigation system 7 sends the information on the target route of the vehicle to the ECU 20. The navigation system 7 may have a part of its function performed by the server of some facilities, such as the information processing center, that is capable of communicating with the vehicle. The function of the navigation system 7 may be performed by the ECU 20.

The target route described in this specification includes a target route, generated automatically based on the past destination history and the map information when the destination is not explicitly set by the driver, such as a road-following traveling route in the "driving assistance device" described in Japanese Patent No. 5382218 (WO2011/158347) or in the "autonomous driving device" described in Japanese Patent Application Publication No. 2011-162132 (JP 2011-162132 A).

The actuator 8 is a device that performs the traveling control of the vehicle. The actuator 8 includes at least a throttle actuator, a brake actuator, and a steering actuator. The throttle actuator controls the amount of air to be supplied to the engine (throttle angle) according to the control signal from the ECU 20 to control the driving force of the vehicle. When the vehicle is a hybrid vehicle, the amount of air to be supplied to the engine, as well as the control signal from the ECU 20 to the motor that works as the source of power, is received to control the driving force. When the vehicle is an electric vehicle, the control signal from the ECU 20 to the motor that works as the source of power is received to control the driving force. The motor that works as the source of power in this case configures the actuator 8.

The brake actuator controls the brake system according to the control signal, received from the ECU 20, to control the braking force to be applied to the wheels of the vehicle. As the brake system, a hydraulic brake system may be used. The steering actuator controls the driving of the assist motor, which is one component of the electric power steering system for controlling the steering torque, according to the control signal received from the ECU 20. By doing so, the steering actuator controls the steering torque of the vehicle.

The HMI 9 is an interface for sending and receiving information between an occupant (for example, the driver) of the vehicle and the autonomous driving system 100. The HMI 9 has a display for displaying image information to the occupants, a speaker for sending voices to the occupants, and operation buttons or a touch panel for allowing the occupants to perform input operations. The HMI 9 sends the information, entered by an occupant, to the ECU 20. In addition, the HMI 9 displays image information on the display, and sends voices via the speaker, in response to the control signal from the ECU 20.

The traveling result database 10 is a database that stores the traveling result of the vehicle traveled under autonomous driving control. The traveling result database 10 stores the past traveling trajectories of the vehicle traveled under autonomous driving control based on the second vehicle position that will be described later, the position detection processing used to detect the second vehicle position, and the traveling scene, all of which are associated with the map information. The map database 5, the logic database 6, and the traveling result database 10 need not necessarily be mounted on the vehicle, but may be provided in a server capable of communicating with the vehicle.

Next, the functional configuration of the ECU 20 is described. The ECU 20 includes a road environment recognition unit 21, a vehicle status recognition unit 22, a first vehicle position detection unit 23, a traveling scene identification unit 24, a second vehicle position detection unit 25, a determination unit 26, a travel plan generation unit 27, an autonomous driving control unit 28, and a changing unit 29.

The road environment recognition unit 21 recognizes the road environment around the vehicle based on the detection result of the external sensor 1. The road environment includes the positions of the white lines (partitioning lines) that form the traveling lane in which the vehicle travels, the line type of the white lines, the road shape (including the road curvature), the lane width, and the positions of obstacles. The road environment may include the cant of the traveling lane and the slope of the traveling lane. The road environment recognition unit 21 recognizes the road environment around the vehicle using a known method based on the images captured by the camera or the obstacle information obtained by the radar sensor. The road environment recognition unit 21 recognizes the obstacles around the vehicle and the positions of the white lines of the driving lane based on the images captured by the camera or the obstacle information obtained by the radar sensor.

The vehicle status recognition unit 22 recognizes the traveling status of the vehicle, including the vehicle speed and the direction of the vehicle, based on the detection results of the internal sensor 3. The vehicle status includes the vehicle speed of the vehicle, the acceleration of the vehicle, and the yaw rate of the vehicle. More specifically, the vehicle status recognition unit 22 recognizes the vehicle speed of the vehicle based on the vehicle speed information obtained by the vehicle speed sensor. The vehicle status recognition unit 22 recognizes the direction of the vehicle based on the yaw rate information obtained by the yaw rate sensor. The vehicle speed of the vehicle and the yaw rate of the vehicle are used for detecting the vehicle position.

The first vehicle position detection unit 23 detects the first vehicle position, which is a vehicle position on the map, based on the measurement result of the positioning unit 2 and the map information stored in the map database 5. The first vehicle position detection unit 23 performs the default position detection processing (default position detection logic) to detect the first vehicle position regardless of the traveling scene of the vehicle. That is, the first vehicle position refers to the vehicle position on the map detected by the default position detection processing. The default position detection processing is, for example, the processing in which the measurement result of the positioning unit 2 is map-matched with the map information. In the default position detection processing, the past measurement result of the positioning unit 2 may be used to correct the vehicle position. As the default position detection processing, known processing may be used.

In addition, the first vehicle position detection unit 23 uses the detection result of the external sensor 1 to detect the first vehicle position. The first vehicle position detection unit 23 matches the white-line edge points, extracted from a camera-captured image, against the position information on white lines, included in the map information, to correct the vehicle position. An edge point refers to a point composed of pixels which configure an image and whose brightness difference from the adjacent pixels is equal to or larger than a predetermined value. The detection result of the external sensor 1 need not necessarily be used.

The traveling scene identification unit 24 identifies a traveling scene of the vehicle based on the first vehicle position, detected by the first vehicle position detection unit 23, and the map information stored in the map database 5. The traveling scene refers to the traveling status of the vehicle and the situation around the vehicle that are identified separately for selecting position detection processing to be used in a dynamic position detection logic that will be described.

The traveling scenes include the following: a scene in which the vehicle travels in a lane in which one of the two white lines is a double line and the other is a single line, a scene in which the vehicle travels along a curve with a cant angle that is equal to or larger than a predetermined value, a scene in which the vehicle travels in a tunnel, a scene in which the vehicle passes through the exit of a curve, and a scene in which the vehicle travels near a map-information-identified position associated with a camera-captured image stored in the logic database 6. The traveling scenes may be classified according to the road shape (road type indicating whether the road is a curved road or a straight road, the curvature of a curve, the cant angle, etc.) and the road width. The traveling scenes may be stored in advance in the map database 5 in association with the map information (latitude, longitude).

The second vehicle position detection unit 25 detects the second vehicle position, which is a vehicle position on the map, by performing the position detection processing associated with a traveling scene in advance, based on the detection result of the external sensor 1, the measurement result of the positioning unit 2, and the map information stored in the map database 5. The second vehicle position detection unit 25 detects the second vehicle position by performing the position detection processing (dynamic position detection logic) associated with each traveling scene. That is, the second vehicle position is a vehicle position on the map detected by the position detection processing associated with each traveling scene.

The second vehicle position detection unit 25 acquires the position detection processing, associated with the traveling scene, from the logic database 6 based on the traveling scene identified by the traveling scene identification unit 24. The second vehicle position detection unit 25 uses the acquired position detection processing to detect the second vehicle position. As with the default position detection processing, the dynamic position detection processing includes the processing for map-matching the measurement result of the positioning unit 2 with the map information.

The dynamic position detection processing associated with each traveling scene is described in detail below.

<Dynamic Position Detection Processing 1>

When the traveling scene is identified as a scene in which the vehicle travels in a lane where one of the two white lines (left and right) is a double line and the other is a single line, the second vehicle position detection unit 25 performs the position detection processing for detecting the second vehicle position using only the position information on the other white line that is a single line. This means that, when the white line that is a double line is used for detecting the second vehicle position, there is a possibility that an erroneous detection will result. Therefore, the position detection processing that detects the second vehicle position using only the position information on the other white line, which is a single line, is associated with the traveling scene described above. Similar position detection processing may be performed for a scene in which the vehicle travels in a lane in which one of the white lines is not a double line but a part of a zebra zone. The second vehicle position detection unit 25 acquires the position information on the white lines based on the detection result of the external sensor 1 (camera-captured image, obstacle information obtained by the radar sensor). In addition to the methods described above, the position information on a white line can be acquired using various known methods.

<Dynamic Position Detection Processing 2>

When the traveling scene is identified as a scene in which the vehicle travels along a curve with a cant angle that is equal to or larger than a predetermined value, the second vehicle position detection unit 25 performs the position detection processing for detecting the second vehicle position using only the position information on the white line that is one of the two white lines (left and right) and is inside the curve. That is, along a curve with a cant angle that is equal to or larger than a predetermined value, there is a possibility that the outside white line of the curve cannot be recognized correctly due to the inclination of the vehicle. Therefore, the position detection processing for detecting the second vehicle position using only the position information on the inside white line of the curve is associated with the traveling scene described above. As the cant angle, the information included in the map information may be used. Depending upon the mounting position of the camera or the radar sensor and depending upon the vehicle type, the position detection processing for detecting the second vehicle position using only the position information, not on the inside white line of the curve but on the outside white line of the curve, may be associated with the traveling scene described above.

The traveling scene may be identified considering the curve shape. In other words, if the vehicle travels in a scene in which the vehicle travels along a curve with a cant angle that is equal to or larger than a predetermined value but if the curve shape is different, the white line whose position information is used for detecting the second vehicle position may be exchanged between the inside white line and the outside white line or the position information on both the inside white line and the outside white line may be used.

<Dynamic Position Detection Processing 3>

When the traveling scene is identified as a scene in which the vehicle travels in a tunnel, the second vehicle position detection unit 25 performs the position detection processing for detecting the second vehicle position using the vehicle speed and the yaw rate of the vehicle instead of the measurement result of the positioning unit 2 obtained using the GPS. The position detection processing for detecting the second vehicle position using the vehicle speed and the yaw rate of the vehicle refers to the processing for detecting the second vehicle position from the per-unit-time vehicle traveling distance obtained from the vehicle speed of the vehicle, the direction of the vehicle obtained from the yaw rate of the vehicle, and the elapsed time. Since GPS accuracy is reduced in a tunnel, the position detection processing for detecting the second vehicle position using the vehicle speed and the yaw rate of the vehicle is associated with the traveling scene described above. Similar position detection processing may be used for a scene in which the vehicle travels under an overpass.

<Dynamic Position Detection Processing 4>

When the traveling scene is identified as a scene in which the vehicle passes through the exit of a curve, the second vehicle position detection unit 25 performs the position detection processing that does not use the vehicle status amount estimation processing. (for example, filtering with the Kalman filter, etc.). Even if the vehicle status amount estimation processing is not used, the value range is limited to prevent the position from being identified as an extremely different position. The second vehicle position detection unit 25 usually performs the position detection processing that uses the vehicle status amount estimation processing for stably detecting the second vehicle position. As the vehicle status amount estimation processing, any known processing may be used.

In a predetermined traveling scene such as a scene in which the vehicle passes through the exit of a curve, experience shows that the detection result of the second vehicle position is more stable when the vehicle status amount estimation processing is not used. For this reason, the position detection processing that does not use the vehicle status amount estimation processing is associated with the predetermined traveling scene. The predetermined traveling scene may include a scene in which errors occur in a predetermined direction continuously within a predetermined time and, in addition, those errors occur less discontinuously within a predetermined time when the second vehicle position not using the vehicle status amount estimation processing is performed, as indicated by comparison between the second vehicle position using the vehicle status amount estimation processing and the second vehicle position not using the vehicle status amount estimation processing. The scene in which the vehicle passes through the exit of a curve is an example only and need not necessarily be included in the predetermined traveling scene.

<Dynamic Position Detection Processing 5>

When the traveling scene is identified as a scene in which the vehicle travels near a position in the map information associated with a camera-captured image stored in the logic database 6, the second vehicle position detection unit 25 matches the current camera-captured image against the camera-captured image stored in the logic database 6 to perform the position detection processing for detecting the second vehicle position. That is, the position detection processing through matching between camera-captured images is associated the traveling scene described above.

Figure 2:
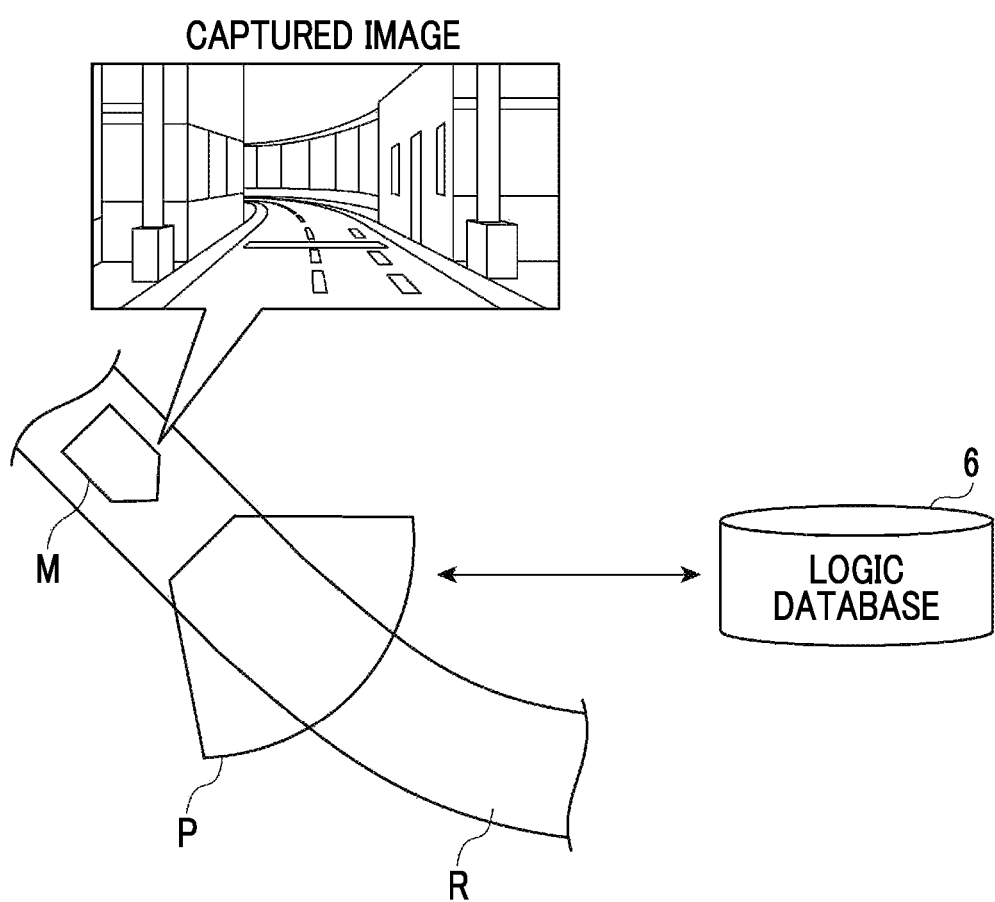
FIG. 2 is a diagram showing the detection of a vehicle position through matching between camera captured images.

FIG. 2 is a diagram showing the detection of a vehicle position through matching between camera-captured images. FIG. 2 shows a vehicle M, a traveling lane R in which the vehicle M travels, and a range P captured by the camera on the vehicle M. As shown in FIG. 2, the autonomous driving system 100 stores the camera-captured images of the vehicle M, which is traveling, in the logic database 6 in association with the map information (latitude and longitude of the image-captured position). The second vehicle position detection unit 25 matches the current camera-captured image against the camera-captured images stored in the logic database 6 to perform the position detection processing for detecting the second vehicle position.

To perform the position detection processing accurately, it is required that the map information (latitude, longitude) associated with a camera-captured image stored in the logic database 6 be accurate and that the camera-captured image stored in the logic database 6 be uniform. Uniformity means that the second vehicle position can be uniquely determined by the captured image with no error in image matching in the left and right directions, the longitudinal direction, and the direction of the vehicle. For example, for a captured image of a zebra zone on the road surface, the captured image is not uniform if a zebra zone of the same shape appears in the image at a position different from the position in the map information associated with the captured image. Whether the current camera-captured image matches a captured image stored in the logic database 6 may be determined by checking whether there is one high peak in the correlation values when autocorrelation is calculated through image processing. From the viewpoint of higher matching accuracy, non-moving obstacles such as telephone poles and the markings painted on the road surface are included in the captured images in some embodiments. In addition, the captured image of a position, such as the position before a curve or the position of the gate of an electronic toll collection system (ETC), if stored in the logic database 6, is used efficiently to correct the vehicle position during autonomous driving control (especially, to correct the vehicle position in the longitudinal direction). In addition, the captured image of a position where the landscape is not easily affected by sunshine (shadow) and seasons is stored in some embodiments.

When generating a travel plan by the travel plan generation unit 27 that will be described later, a travel plan may be, generated in such a way that, as a recommended route, a route that passes through many positions included in the map information and associated with the captured images stored in the logic database 6.

<Dynamic Position Detection Processing 6>

For example, when an image matching method, such as Phase Only Correlation [POC], is used for the camera-captured images to detect the second vehicle position, accuracy in detecting the second vehicle position may be reduced in an environment where the number of image matching clues is insufficient, for example, at night. One of the reasons for this reduction is that there are two or more maximum values in the correlation distribution of the brightness information on the captured images and, therefore, the maximum value cannot be uniquely identified. In this case, the correlation distribution may be smoothed according to the principle similar to that of a low-pass filter by changing the normalized weight of the correlation in the frequency region of the captured images. This allows the vehicle lateral position to be clearly identified.

In the description below, let F(w) be the frequency of road surface images for which matching is performed using phase only correlation, and let G(w) be the frequency of pseudo road surface images generated from the map information. The strength of smoothing is adjusted by calculating the correlation according to the following formula (1) given below where the normalized weight is α. H (w) is the correlation distribution. H(w)=F(w)G (w)/[|F (w)||G (w)|]^α . . . (1) The correlation corresponds to the cross-correlation when the weight α=0, and to the general phase only correlation when α=1. When the weight α=½, the correlation distribution becomes noisy due to an insufficient number of image matching clues, for example, at night and, as a result, the maximum value is ambiguous. However, in a situation where the vehicle lateral position can be clearly identified by applying a predetermined low-pass filter, the vehicle lateral position can be stably estimated.

In addition, the second vehicle position detection unit 25 has the learning function for learning about the position detection processing appropriate to the traveling scene. The learning function of the second vehicle position detection unit 25 will be described later.

The determination unit 26 determines whether the distance between the first vehicle position detected by the first vehicle position detection unit 23 and the second vehicle position detected by the second vehicle position detection unit 25 is equal to or smaller than the threshold. The threshold is a value that is set in advance.

In addition, the determination unit 26 determines whether an intervention operation has been performed by the driver of the vehicle during autonomous driving control, based on the detection result of the driving operation detection unit 4. The intervention operation refers to an operation of the driver to cancel the autonomous driving control and start the manual operation. The determination unit 26 determines that an intervention operation has been performed when the steering amount of the steering wheel exceeds a predetermined value. In addition, the determination unit 26 determines that an intervention operation has been performed when the depression amount of the accelerator pedal or the brake pedal exceeds a predetermined value.

The travel plan generation unit 27 generates a travel plan of the vehicle. If the determination unit 26 determines that the distance between the first vehicle position and the second vehicle position is equal to or smaller than the threshold, the travel plan generation unit 27 generates a travel plan of the vehicle based on the second vehicle position. If the determination unit 26 determines that the distance between the first vehicle position and the second vehicle position is not equal to or smaller than the threshold, the travel plan generation unit 27 generates a travel plan of the vehicle based on the first vehicle position.

The travel plan generation unit 27 generates a travel plan of the vehicle based on the first vehicle position or the second vehicle position as well as on the target route that is set by the navigation system 7 and the map information stored in the map database 5. When the driver performs an operation to start autonomous driving control, the travel plan generation unit 27 starts generating a travel plan.

The autonomous driving control unit 28 performs the autonomous driving control of the vehicle based on the travel plan generated by the travel plan generation unit 27. The autonomous driving control unit 28 sends the control signal to the actuator 8 to perform the autonomous driving control of the vehicle.

In addition, if the determination unit 26 determines that the distance between the first vehicle position and the second vehicle position is not equal to or smaller than the threshold or if the determination unit 26 determines that an intervention operation has been performed by the driver of the vehicle, the autonomous driving control unit 28 terminates the autonomous driving control after a predetermined time and performs the manual driving switching processing to switch the driving to the manual driving of the driver. The autonomous driving control unit 28 notifies the driver about the termination of autonomous driving control via a HMI 9. The autonomous driving control unit 28 continues the autonomous driving control of the vehicle based on the travel plan generated from the first vehicle position until the manual driving switching processing is completed.

If the determination unit 26 determines that the distance between the first vehicle position and the second vehicle position is not equal to or smaller than the threshold but if the determination unit 26 determines that the distance between the first vehicle position and the second vehicle position becomes equal to or smaller than the threshold before the autonomous driving control is terminated, the autonomous driving control unit 28 need not terminate, but may continue, autonomous driving control.

[Configuration of Learning in the Autonomous Driving System]

Next, the configuration of learning in the autonomous driving system 100 in this embodiment is described. The autonomous driving system 100 performs learning about the dynamic position detection processing.

If the determination unit 26 determines that the distance between the first vehicle position and the second vehicle position is not equal to or smaller than the threshold or if the determination unit 26 determines that an intervention operation has been performed by the driver, the second vehicle position detection unit 25 changes the position detection processing (more specifically, changes the position detection processing from the current position detection processing to new position detection processing) because there is a possibility that the position detection processing currently associated with the traveling scene (the traveling scene at the time of determination) is not appropriate. The second vehicle position detection unit 25 redetects the second vehicle position by performing the new position detection processing. The redetection of the second vehicle position refers to the detection of the second vehicle position by performing the new position detection processing under the same second-vehicle-position detection condition (the same detection result of the external sensor 1, the same measurement result of the positioning unit 2) as that used for the position detection processing before the change.

The determination unit 26 determines whether the distance between the redetected second vehicle position and the first vehicle position is equal to or smaller than the threshold. The second vehicle position detection unit 25 repeatedly changes the position detection processing until it is determined that the distance between the redetected second vehicle position and the first vehicle position becomes equal to or smaller than the threshold. The second vehicle position detection unit 25 changes the position detection processing in the rotation sequence that is set in advance. If it is determined that the distance between the redetected second vehicle position and first vehicle position is equal to or smaller than the threshold, the second vehicle position detection unit 25 associates the position detection processing, performed at that time, with the traveling scene. The second vehicle position detection unit 25 stores the position detection processing and the traveling scene, which are newly associated, in the logic database 6. In this way, the second vehicle position detection unit 25 learns the position detection processing by which the distance between the second vehicle position and the first vehicle position becomes equal to or smaller than the threshold. If there is no position detection processing by which the distance between the redetected second vehicle position and the first vehicle position becomes equal to or smaller than the threshold, the second vehicle position detection unit 25 may associate the position detection processing, by which the distance becomes smallest, with the traveling scene.

The changing unit 29 determines whether to change the position detection processing associated with a traveling scene based on the traveling result stored in the traveling result database 10. Based on the traveling result stored in the traveling result database. 10, the changing unit 29 calculates, for each traveling scene, the variance of the traveling trajectories of the vehicle that have been generated as a result of autonomous driving control based on the second vehicle position detected by the same position detection processing. The traveling scene is identified by a vehicle position on the map. The variance of the traveling trajectories can be calculated by a known method.

For each traveling scene, the changing unit 29 determines whether the variance of the traveling trajectories is equal to or larger than the variance threshold. The variance threshold is a threshold that is set in advance to determine whether to change the position detection processing. For each traveling scene, if the variance of the traveling trajectories is equal to or larger than the variance threshold, the changing unit 29 changes the position detection processing (more specifically, changes the position detection processing from the current-associated position detection processing to new position detection processing). That is, the changing unit 29 associates the new position detection processing with the traveling scene and stores the associated pair in the logic database 6. The changing unit 29 changes the position detection processing in the rotation sequence that is set in advance. In this way, the changing unit 29 evaluates the position detection processing (evaluation using the variance of the traveling trajectories) and changes the position detection processing repeatedly, thus learning the high-detection-accuracy position detection processing suitable for the traveling scene.

The changing unit 29 may change the position detection processing, associated with a scene in which the vehicle travels along a curve, to the position detection processing that uses only the position information on the inside white line of the two white lines (right and left) of the curve, to the position detection processing that uses only the position information on the outside white line of the curve, or to the position detection processing that uses the positional information on the two white lines (right and left) of the curve. With emphasis on an error with respect to the true value as well as on reproducibility (smaller variance of errors on each detection), the changing unit 29 associates appropriate position detection processing with a traveling scene and stores the associated pair in the logic database 6.

The changing unit 29 may change the position detection processing, associated with a traveling scene in which a plurality of sensors (GPS, camera, radar sensors, etc.) can be used, to the position detection processing that uses different sensors (position detection processing that uses only the GPS, position detection processing that uses only the camera, position detection processing that uses only the radar sensors, position detection processing that uses only the camera and radar sensors). The changing unit 29 associates the position detection processing that minimizes the discontinuous detection of the second vehicle position with the traveling scene and stores the associated pair in the logic database 6.

If there is a traveling scene in which the second vehicle position can be detected by phase only correlation using a camera-captured image, in which the correlation distribution of the captured images is noisy, and in which the reliability of the second vehicle position given by the maximum value of the correlation distribution is low, the changing unit 29 may change the position detection processing to the dynamic position detection processing 6 described above. If this change proves to be effective a predetermined number of times continuously (e.g. 10 times), the changing unit 29 associates the above-described dynamic position detection processing 6 with the traveling scene and stores the associated pair in the logic database 6. In this way, the logic database 6 can be built serially.

If there is a traveling scene in which the position detection processing using the vehicle status amount estimation processing (e.g. Kalman filter) can be used and in which the distance between the second vehicle position detected using the vehicle status amount estimation processing and the second vehicle position detected without using the vehicle status amount estimation processing is equal to or larger than a predetermined threshold, the changing unit 29 changes the position detection processing to the position detection processing that does not use the vehicle status amount estimation processing if the distance is equal to or larger than the predetermined threshold a predetermined number of times continuously (e.g. 10 times).

The changing unit 29 may calculate the detection reliability of the second vehicle position detected by the second vehicle position detection unit 25. In the dynamic position detection processing 5 described above, the changing unit 29 calculates the detection reliability based on the correlation value of matching between the current camera-captured image and the camera-captured image stored in the logic database 6. If the detection reliability varies greatly from low to high (if the reliability increases from the state equal to or lower than the predetermined threshold by an amount equal to or larger than the predetermined amount), the changing unit 29 may change the position detection processing associated with the traveling scene upon a determination that the second vehicle position is not accurately detected in the traveling scene corresponding to the low detection-reliability state. In addition, in the dynamic position detection processing 5 described above, the changing unit 29 may calculate the reliability for each captured image. If the detection of the second vehicle position is performed by captured-image matching a plurality number of times and the detection proves to be effective (the correlation value of the vehicle position detection does not become unstable), the changing unit 29 increases the reliability of the captured image. Conversely, if the correlation value becomes unstable, the changing unit 29 deletes the captured image from the logic database 6 upon a determination that the captured image is not appropriate. The changing unit 29 deletes inappropriate captured images at predetermined time intervals to prevent low-efficiency captured images from being increased.

[Autonomous Driving Control of the Autonomous Driving System]

The autonomous driving control of the autonomous driving system 100 in this embodiment is described below. FIG. 3 is a flowchart showing the autonomous driving control of the autonomous driving system. The flowchart shown in FIG. 3 is executed when autonomous driving control is started by the start operation of the autonomous driving control performed by the driver.

As shown in FIG. 3, the ECU 20 of autonomous driving system 100 detects the first vehicle position by the first vehicle position detection unit 23 in S10. The first vehicle position detection unit 23 performs the default position detection processing to detect the first vehicle position, which is a vehicle position on the map, based on the measurement result of the positioning unit 2 and the map information stored in the map database 5.

In S12, the ECU 20 identifies the traveling scene of the vehicle by the traveling scene identification unit 24. The traveling scene identification unit 24 identifies the traveling scene of the vehicle based on the first vehicle position detected by the first vehicle position detection unit 23 and the map information stored in the map database 5.

In S14, the ECU 20 detects the second vehicle position by the second vehicle position detection unit 25. The second vehicle position detection unit 25 detects the second vehicle position, which is a vehicle position on the map, by performing the position detection processing (dynamic position detection processing) associated in advance with the traveling scene, based on the detection result of an external sensor 1, the measurement result of the positioning unit 2, and the map information stored in the map database 5.

In S16, ECU 20 uses the determination unit 26 to determine whether the distance between the first vehicle position and the second vehicle position is equal to or smaller than the threshold and, at the same time, determines whether an intervention operation has been performed by the driver of the vehicle. If it is determined that the distance between the first vehicle position and the second vehicle position is equal to or smaller than the threshold and that an intervention operation has not been performed by the driver of the vehicle (S16: YES), the ECU 20 passes control to S18. If is it determined that the distance between the first vehicle position and the second vehicle position is not equal to or smaller than the threshold or that an intervention operation has been performed by the driver of the vehicle (S16: NO), the ECU 20 passes control to S22.

In S18, the ECU 20 uses the travel plan generation unit 27 to generate a travel plan of the vehicle based on the second vehicle position. The travel plan generation unit 27 generates a travel plan of the vehicle based on the second vehicle position, the target route that is set by the navigation system 7, and the map information stored in the map database 5.

In S20, the ECU 20 uses the autonomous driving control unit 28 to perform the autonomous driving control of the vehicle. The autonomous driving control unit 28 sends the control signal to the actuator 8 based on the travel plan generated using the second vehicle position and performs the autonomous driving control of the vehicle. After that, the ECU 20 passes control back to S10 to repeat the processing.

In S22, ECU 20 uses the travel plan generation unit 27 to generate a travel plan of the vehicle based on the first vehicle position. The travel plan generation unit 27 generates the travel plan of the vehicle based on the first vehicle position, the target route that is set by the navigation system 7, and the map information stored in the map database 5.

In S24, the ECU 20 uses the autonomous driving control unit 28 to perform the autonomous driving control of the vehicle and, at the same time, notifies the driver about the termination of autonomous driving via the HMI 9. Based on the travel plan generated using the first vehicle position, the autonomous driving control unit 28 sends the control signal to the actuator 8 to perform the autonomous driving control of the vehicle. The HMI 9 notifies about the termination of autonomous driving by an image display on the display or a voice output from the speaker based on the control signal from the autonomous driving control unit 28.

In S26, the ECU 20 uses the autonomous driving control unit 28 to perform the manual operation switching processing. After a predetermined time passes to allow the driver to prepare for the manual operation, the autonomous driving control unit 28 terminates the autonomous driving control and performs manual driving switching process for switching the driving to manual driving. As a result, ECU 20 terminates the autonomous driving control.

[Learning Processing in the Autonomous Driving System]

Next, the learning processing performed in the autonomous driving system 100 in this embodiment is described. FIG. 4 is a flowchart showing the learning processing in the autonomous driving system. The flowchart shown in FIG. 4 is performed when the determination result in S16 in FIG. 3 is NO.

As shown in FIG. 4, the ECU 20 uses the second vehicle position detection unit 25 to change the position detection processing in S30. The second vehicle position detection unit 25 changes the position detection processing in the rotation sequence that is set in advance.

In S32, the ECU 20 uses the second vehicle position detection unit 25 to redetect the second vehicle position. The second vehicle position detection unit 25 redetects the second vehicle position by performing new position detection processing under the same second-vehicle-position detection condition as that used by the position detection processing performed before the change.

In S34, the ECU 20 uses the determination unit 26 to determine whether the distance between the redetected second vehicle position and the first vehicle position (first vehicle position detected in S10 in FIG. 3) is equal to or smaller than the threshold. If it is determined that the distance between the redetected second vehicle position and the first vehicle position is not equal to or smaller than the threshold (S34: NO), the ECU 20 passes control back to S30 to repeat the processing because detection accuracy cannot be secured by the current position detection processing If there is no position detection processing by which the distance between the redetected second vehicle position and the first vehicle position becomes equal to or smaller than the threshold, the ECU 20 may associate the position detection processing, by which the distance becomes smallest, with the traveling scene. If it is determined that the distance between the redetected second vehicle position and the first vehicle position is equal to or smaller than the threshold (S34: YES), the ECU 20 passes control to S36.

In S36, the ECU 20 uses the second vehicle position detection unit 25 to associate the new position detection processing with the traveling scene. The second vehicle position detection unit 25 associates the traveling scene with the new position detection processing and stores the associated pair in logic database 6. After that, the ECU 20 terminates the current processing.

FIG. 5 is a flowchart showing another example of the learning processing performed in the autonomous driving system. The flowchart shown in FIG. 5 is performed regularly.

As shown in FIG. 5, the ECU 20 uses the changing unit 29 in S40 to calculate the variance of the past traveling trajectories of the vehicle. Based on the traveling result stored in the traveling result database 10, the changing unit 29 calculates, for each traveling scene, the variance of the traveling trajectories of the vehicle that have been generated as a result of autonomous driving control based on the second vehicle position detected by the same position detection processing.

In S42, the ECU 20 uses the changing unit 29 to determine, for each traveling scene, whether the variance of the traveling trajectories is equal to or larger than the variance threshold. If the variance of the traveling trajectories is not equal to or larger than the variance threshold (S42: NO), the ECU 20 terminates the current processing. If the variance of the traveling trajectories is equal to or larger than the variance threshold (S42: YES), the ECU 20 passes control to S44.

In S44, the ECU 20 uses the changing unit 29 to change the position detection processing. The changing unit 29 changes the position detection processing in the rotation sequence that is set in advance. After that, the ECU 20 terminates the current processing.

[Effect of Autonomous Driving System]

The autonomous driving system 100 in this embodiment described above identifies the traveling scene of the vehicle based on the first vehicle position obtained from the measurement result of the positioning unit 2 and the map information stored in the map database 5 and detects the second vehicle position by the position detection processing associated with the traveling scene in advance. This allows the autonomous driving system 100 to use position detection processing appropriate to the traveling scene of the vehicle, thus increasing accuracy in detecting the vehicle position for use in autonomous driving control. In addition, if it is determined that the distance between the first vehicle position and the second vehicle position is not equal to or smaller than the threshold, there is a possibility that the position detection processing of the second vehicle position is not appropriate. Therefore, in this case, the autonomous driving system 100 performs the autonomous driving control of the vehicle based on the first vehicle position that does not depend on the traveling scene, thereby avoiding autonomous driving control based on a wrong vehicle position.

In addition, if it is determined that the distance between the first vehicle position and the second vehicle position is not equal to or smaller than the threshold, or if an intervention operation has been performed by the driver of the vehicle during autonomous driving, there is a possibility that the position detection processing associated with the traveling scene is not appropriate. In this case, the autonomous driving system 100 changes the position detection processing and associates the position detection processing, corresponding to the time when it is determined that the distance between the first vehicle position and the second vehicle position is equal to or smaller than the threshold, with the travelling scene. This allows the autonomous driving system 100 to learn high-accuracy position detection processing suitable for the traveling scene.

In addition, if the variance of the past traveling trajectories of the vehicle generated during autonomous driving control based on the second vehicle position is equal to or larger than the variance threshold in a traveling scene, the autonomous driving system 100 changes the position detection processing since there is a possibility that the position detection processing associated with the traveling scene is not appropriate. This allows the autonomous driving system 100 to avoid continuously using the position detection processing that is not suitable for the traveling scene and is low in accuracy.

While some embodiments of the present disclosure have been described, the present disclosure is not limited to the embodiments described above. The present disclosure may be implemented not only by the embodiments described above but also in various modes in which modifications and improvements are added based on the knowledge of those skilled in the art.

The positioning unit 2 is not limited to a positioning apparatus (GPS receiver unit) using the GPS. The positioning unit 2 may be a camera or a radar sensor. The positioning unit 2 is only required to include at least one of the GPS receiver unit, camera, and radar sensor.

A part of the ECU 20 functions may be provided in a server capable of communicating with the vehicle. Specifically, at least one or more of the first vehicle position detection unit 23; traveling scene identification unit 24, second vehicle position detection unit 25, determination unit 26, travel plan generation unit 27, and changing unit 29 may be provided in a server capable of communicating with the vehicle.

Furthermore, the autonomous driving system 100 need not necessarily have the learning function. The autonomous driving system 100 may be in a mode in which the second vehicle position detection unit 25 does not learn the position detection processing. In addition, the autonomous driving system 100 may be in a mode in which the changing unit 29 and the traveling result database 10 are not provided.

In addition, camera-captured images need not necessarily be stored in the logic database 6. The autonomous driving system 100 does not need to be able to perform all of the dynamic position detection processing described above.

The autonomous driving system 100 does not always need to take an intervention operation of the driver into consideration. That, even if it is determined that an intervention operation has been performed by the driver, the autonomous driving system 100 may continue autonomous driving control using the second vehicle position. In addition, even if it is determined that an intervention operation has been performed by the driver, the second vehicle position detection unit 25 does not always need to change the position detection processing. In addition, even if the distance between the first vehicle position and the second vehicle position is not equal to or smaller than the threshold, the autonomous driving system 100 does not always need to terminate autonomous driving control and switch to manual driving.

In the autonomous driving systems, if it is determined that the distance between the first vehicle position and the second vehicle position is not equal to or smaller than the threshold, or if an intervention operation has been performed by the driver of the vehicle during autonomous driving, the second vehicle position detection unit may redetect the second vehicle position by changing the position detection processing used for detecting the second vehicle position and associate the position detection processing, corresponding to the time at which the redetected second vehicle position and the first vehicle position is equal to or smaller than the threshold with the traveling scene. If it is determined that the distance between the first vehicle position and the second vehicle position is not equal to or smaller than the threshold, or if an intervention operation has been performed by the driver of the vehicle during autonomous driving, there is a possibility that the position detection processing associated with the traveling scene is not appropriate. In this case, the autonomous driving system changes the position detection processing and associates the position detection processing, corresponding to the time when it is determined that the distance between the first vehicle position and the second vehicle position is equal to or smaller than the threshold, with the travelling scene. This allows the autonomous driving system to learn high-accuracy position detection processing suitable for the traveling scene.

The autonomous driving system may further include a traveling result database that stores past traveling trajectories of the vehicle traveled under the autonomous driving control based on the second vehicle position, the position detection processing used for detecting the second vehicle position, and the traveling scene, all of which are associated with the map information; and a changing unit that calculates, for each of the traveling scenes, the variance of the traveling trajectories, generated by the autonomous driving control that is based on the second vehicle position detected by the same position detection processing, and changes the position detection processing for the traveling scene where the variance is equal to or larger than a variance threshold. If the variance of the past traveling trajectories of the vehicle that traveled under autonomous driving control based on the second vehicle position is equal to or larger than the variance threshold in a traveling scene, the autonomous driving system changes the position detection processing since there is a possibility that the position detection processing associated with the traveling scene is not appropriate. This allows the autonomous driving system to avoid continuously using the position detection processing that is not suitable for the traveling scene and is low in accuracy.

What is claimed is:

1. An autonomous driving system comprising:
   a positioning unit configured to measure a position of a vehicle;
   a map database that stores map information;
   a first vehicle position detection unit configured to detect a first vehicle position based on a measurement result of the positioning unit and the map information, the first vehicle position being a vehicle position on a map;
   a traveling scene identification unit configured to identify a traveling scene of the vehicle based on the first vehicle position and the map information;
   a second vehicle position detection unit configured to detect a second vehicle position by preforming position detection processing, associated in advance with the traveling scene, based on a captured image of a camera mounted on the vehicle or a detection result of a radar sensor mounted on the vehicle, the measurement result of the positioning unit, and the map information, the second vehicle position being a vehicle position on the map;
   a determination unit configured to determine whether a distance between the first vehicle position and the second vehicle position is equal to or smaller than a threshold; and
   an autonomous driving control unit that performs autonomous driving control of the vehicle based on the second vehicle position if it is determined that the distance between the first vehicle position and the second vehicle position is equal to or smaller than the threshold or that performs the autonomous driving control of the vehicle based on the first vehicle position if it is determined that the distance between the first vehicle position and the second vehicle position is not equal to or smaller than the threshold.

2. The autonomous driving system according to claim 1, wherein
   if it is determined that the distance between the first vehicle position and the second vehicle position is not equal to or smaller than the threshold or if an intervention operation has been performed by a driver of the vehicle during execution of autonomous driving, the second vehicle position detection unit redetects the second vehicle position by changing the position detection processing used for detecting the second vehicle position, and associates the changed position detection processing, corresponding to a time at which it is determined that a distance between the redetected second vehicle position and the first vehicle position is equal to or smaller than the threshold, with the traveling scene.

3. The autonomous driving system according to claim 1, further comprising:
   a traveling result database that stores past traveling trajectories of the vehicle traveled under the autonomous driving control based on the second vehicle position, the position detection processing used for detecting the second vehicle position, and the traveling scene, the past traveling trajectories are provided for a plurality of traveling scenes and each traveling scene is associated with at least one of a plurality of position detection processing used for detecting the second vehicle position, at least one of the past traveling trajectories of the vehicle traveled under the autonomous driving control based on the second vehicle position, the position detection processing used for detecting the second vehicle position, and the traveling scene are associated with the map information; and
   a changing unit that calculates, for each of the traveling scenes, a variance of the traveling trajectories, generated by the autonomous driving control that is based on the second vehicle position detected by the same position detection processing, and changes the position detection processing for the traveling scene where the variance is equal to or larger than a variance threshold.

4. An autonomous driving system comprising:
   a positioning unit that measures a position of a vehicle;
   a map database that stores map information;
   an actuator that controls traveling of the vehicle; and
   an electronic controller configured to process:
   a detection of a first vehicle position based on a measurement result of the positioning unit and the map information stored in the map database, the first vehicle position being a vehicle position on a map;
   an identification of a traveling scene of the vehicle based on the first vehicle position and the map information;
   a detection of a second vehicle position by preforming position detection processing, associated in advance with the traveling scene, based on a captured image of a camera mounted on the vehicle or a detection result of a radar sensor mounted on the vehicle, the measurement result of the positioning unit, and the map information stored in the map database, the second vehicle position being a vehicle position on the map; and
   a control of the actuator based on the second vehicle position if a distance between the first vehicle position and the second vehicle position is equal to or smaller than a threshold or a control of the actuator based on the first vehicle position if the distance between the first vehicle position and the second vehicle position is not equal to or smaller than the threshold.

5. The autonomous driving system according to claim 4, wherein if the distance between the first vehicle position and the second vehicle position is not equal to or smaller than the threshold or if an intervention operation has been performed by a driver of the vehicle during the control of the actuator, the electronic controller redetects the second vehicle position by changing the position detection processing used for detecting the second vehicle position, and associates the changed position detection processing, corresponding to a time at which it is determined that a distance between the redetected second vehicle position and the first vehicle position is equal to or smaller than the threshold, with the traveling scene and stores the associated position detection processing and the traveling scene.

6. The autonomous driving system according to claim 4, further comprising:

a traveling result database that stores past traveling trajectories of the vehicle traveled under vehicle traveling control based on the second vehicle position, the position detection processing used for detecting the second vehicle position, and the traveling scene, the past traveling trajectories are provided for a plurality of traveling scenes and each traveling scene is associated with at least one of a plurality of position detection processing used for detecting the second vehicle position, at least one of the past traveling trajectories of the vehicle traveled under the autonomous driving control based on the second vehicle position, the position detection processing used for detecting the second vehicle position, and the traveling scene are associated with the map information, wherein the electronic controller calculates, for each of the traveling scenes, a variance of the traveling trajectories, generated by the vehicle traveling control that is based on the second vehicle position detected by the same position detection processing, and changes the position detection processing for the traveling scene where the variance is equal to or larger than a predetermined threshold.

* * * * *